M. C. SCHWEINERT AND H. P. KRAFT.
COMBINED GAGE AND COUPLING.
APPLICATION FILED AUG. 21, 1915.
1,369,555.
Patented Feb. 22, 1921.
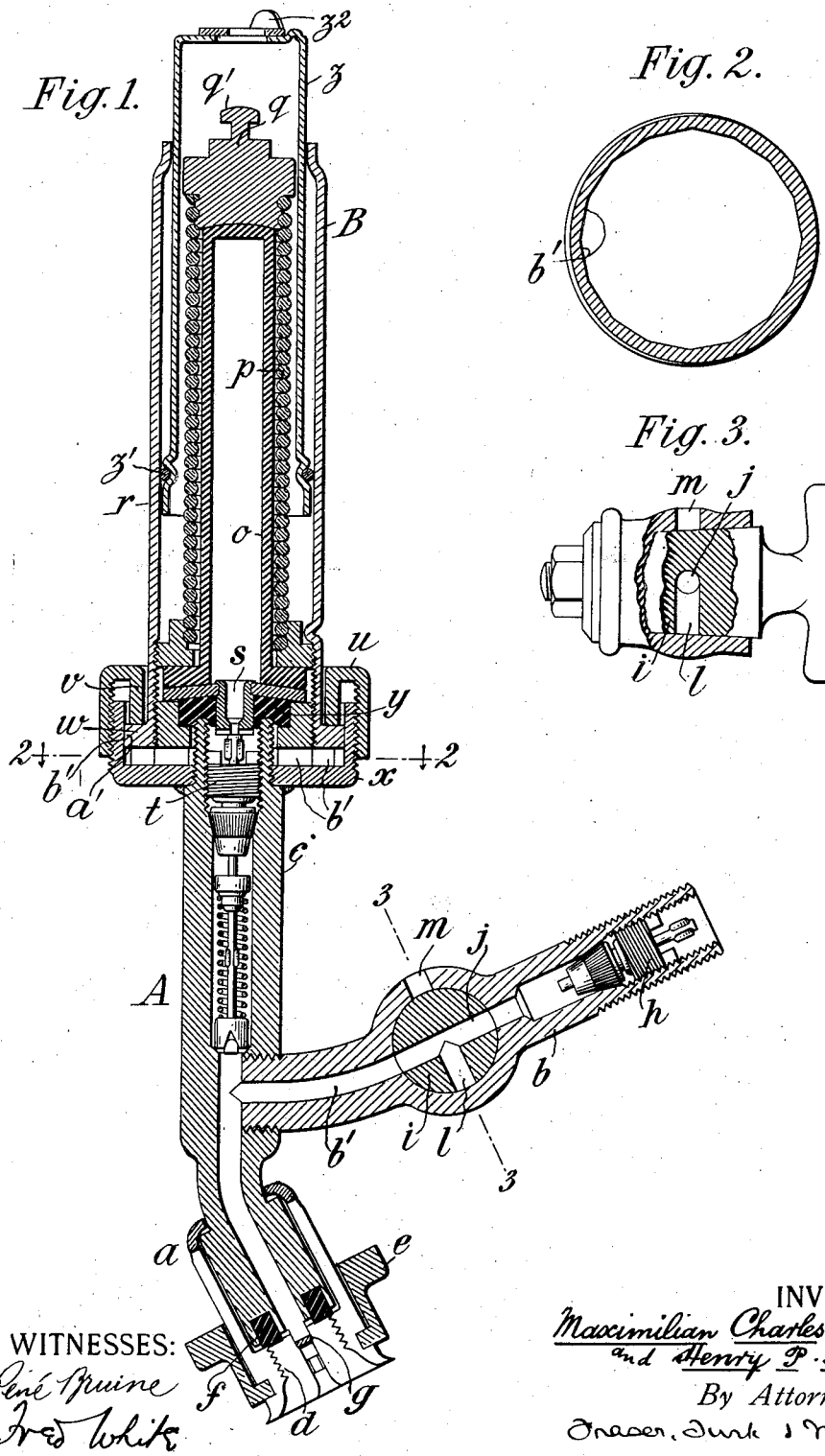

UNITED STATES PATENT OFFICE.

MAXIMILIAN CHARLES SCHWEINERT, OF WEST HOBOKEN, AND HENRY P. KRAFT, OF RIDGEWOOD, NEW JERSEY, ASSIGNORS TO A. SCHRADER'S SON, INCORPORATED, OF BROOKLYN, NEW YORK, A CORPORATION OF NEW YORK.

COMBINED GAGE AND COUPLING.

1,369,555.  Specification of Letters Patent.  Patented Feb. 22, 1921.

Application filed August 21, 1915. Serial No. 46,638.

*To all whom it may concern:*

Be it known that we, MAXIMILIAN CHARLES SCHWEINERT and HENRY P. KRAFT, citizens of the United States, residing in West Hoboken, in the county of Hudson and State of New Jersey, and Ridgewood, in the county of Bergen and State of New Jersey, have invented certain new and useful Improvements in Combined Gages and Couplings, of which the following is a specification.

This invention relates to a combined gage and coupling for use in the inflation of pneumatic tires, although it may be used for other purposes if desired.

The invention is particularly designed for use in connection with inflation tanks or reservoirs as distinguished from hand pumps which are under the immediate control of the operator. It is also susceptible of use in connection with tire pumps such as those which are driven by the motor of an engine or by other means which are more or less separated from the tire to be inflated.

It is customary in such devices to control the flow of air by a cock near the reservoir or by some manual controlling means near the pump. Such means are usually inaccessible to the operator at the tire. According to the present invention we provide a coupling which is adapted to be connected with the source of air pressure by a flexible hose, and in the coupling we provide a hand operable cock by means of which the flow to the tire can be controlled. The cock is so constructed that in one position it opens the passage between the reservoir and the tire and in another position closes it. Preferably also it is so constructed that in a third position it will close communication between the reservoir and the tire and open communication between the tire and atmosphere, the purpose being to relieve the tire pressure without removing the coupling in case the tire has been blown too hard. The valve may also be constructed so as to open communication between the pipe line and the atmosphere if it is desired to do this, as may be the case in operating with a tire pump. The invention has certain other features of improvement which will be hereinafter more fully described.

Referring to the drawings which illustrate one form of the invention,—

Figure 1 is a central vertical section of our improved device.

Fig. 2 is a cross-section on the line 2—2 in Fig. 1.

Fig. 3 is a sectional view of the valve on the line 3—3 in Fig. 1.

Referring to the drawings, let A indicate a coupling. This is shown as a three-branched member having a branch $a$ which is adapted to be connected with a tire valve, a branch $b$ which is adapted to be connected with a pipe line leading to the reservoir or pump and a branch $c$ which is adapted to be connected with a gage such as B. The branch $a$ may have any suitable means for connecting it to a valve such as a series of spring arms $d$ shown which are interiorly threaded to engage the thread of the valve. The arms are rotatably connected with the base of the branch $a$ and are provided with a collar $e$ adapted when pushed downwardly to close in the spring arms, thus engaging them with the valve whereupon by a short turn the connection is made. A packing $f$ serves to make a tight joint between the top of the valve and the branch $a$, and a pin $g$ is provided which presses down the stem of the tire valve so that the latter remains open during the inflating operation.

The branch $b$ is preferably provided with a check valve $h$ designed to close if the pressure in the coupling becomes greater than that in the pipe. This valve is useful if it is desired to remove the coupling from the pipe, and as may be the case if the device has a pressure gage which may be opened without separating the gage B from the coupling. In branch $b$ is located a hand-operated valve $i$ which is shown as a plug valve contained in the bore of the coupling and located between the two ends of the branch $b$. In the construction shown the valve is provided with a straight passage $j$ extending through it from side to side and adapted when the parts are in the position shown in Fig. 1 to lead the air under pressure from the tank or pump into the tire valve. As the tire valve is held in its depressed or open position it is quite evident that there will be an equalization of pressures between the air in the tire and in the branch c. Consequently the gage B (which will be more fully described) indicates during the inflating operation the successive pressures which are reached in the tire. When it is desired to stop the inflating operation it is necessary only to turn the valve a short distance until the passages are out of alinement. This places in the hands of the operator at the point of use a convenient means for controlling the inflating operation, it being unnecessary to leave the tire and operate the usual cock or valve near the tank. During the time required for this the tires are apt to become over-inflated. The valve i is also of value in determining accurately the pressures in the tire. While there is a tendency of the pressures to equalize in the gage and the tire during the act of inflation, this is not always accurate. By the use of the valve i the flow of air in a tire may be stopped momentarily whereupon the pressure in the gage will very quickly equalize so that an accurate reading can be taken. This is particularly true in the case of a tire pump wherein the air is injected into the tire in pulsations which are apt to cause the gage to jump or fluctuate so that it is difficult to read the pressure. In such case the gage may be brought to rest by momentarily closing off the supply of air.

In either of the methods of inflation just described there is a possibility of over-inflation due in the case of the reservoir to the strong inrush of air, and in the case of the pump to the possibility of not gaging the inflow correctly during pulsations of the pump. In such cases it is desirable to relieve the pressure while the coupling is still on the tire valve so that the gage may indicate when the proper reduced pressure is reached. For this purpose the valve is provided with a short passage l leading to the passage j and the coupling is provided with a vent m adapted to register with the passage j so that when the valve is given a quarter turn to the right from the position shown in Fig. 1, the passage l will register with the bore b' of the branch b, and air will be exhausted into the atmosphere. When the gage shows the proper reading, the valve is closed and the coupling removed. In this operation it may be sometimes advisable to occasionally close the valve j to give the pressures a better chance to equalize. If for any reason it is desired to connect the pipe line with the atmosphere, this can be done by giving the valve j a quarter turn to the left, thus closing the inflow of air to the tire but permitting air to flow from the pipe line to the atmosphere.

The gage B may be of any suitable type, but is shown as the well-known Schrader type of gage having an elastic chamber o surrounded by a spring p and having its upper end bearing against a plunger q. The lower end of the chamber makes a leak-tight joint with a casing r and the gage is provided with a pin or abutment s adapted to open the check valve t with which the branch e is provided. The gage is normally held in place by a member u which is screw-threaded to engage a screw-threaded flange x formed on or carried by the branch e. The member u is formed with a downwardly depending flange v, the lower edge of which bears against a flange w formed on the gage. The gage also carries a packing washer y which contacts with the upper end of the branch e, thus forming a tight joint between the parts. The indicating member of the gage is formed as a sleeve z which has a friction ring z' bearing against the inner side of the casing r and designed to hold the sleeve in any position to which it is moved. Preferably the plunger q is formed with a knob q' which passes through the end of the sleeve and which may be caught by a catch $z^2$ whereby the plunger and sleeve are fastened together. In this case the sleeve will retire with the plunger instead of holding its position after the plunger is retracted.

It is very desirable that the gage be connected with the coupling without distorting its packing y and to this end we provide a non-rotative connection between the flange x and the gage. This is preferably done as shown in Fig. 2 by having a series of flats on both parts designated respectively by the reference letters a' and b'. These are preferably numerous so that the gage readily fits within the flange in or close to any position in which it may be applied.

It is hence assured that the gage will always be firmly seated upon the branch e when the coupling is screwed down and the packing y will not be subject to distortion.

We make no claim herein for the construction of gage *per se*, as this forms the subject matter of other applications filed by us.

While we have shown in detail one form of the invention, it will be understood that we do not wish to be limited thereto, as various changes can be made therein without departing from the invention. It is obvious, moreover, that the several branches of the coupling may be formed in one piece of metal if desired.

What we claim is:—

1. A coupling for the purpose described having a plurality of branches, one branch having means for connection with a tire and a tire valve depressor and another branch being adapted for connection with the source of air supply, and a hand-operable valve in said last-named branch adapted to open and close the passage through the branch and to establish communication between the first-named branch and the atmosphere, whereby air may be vented from the tire.

2. A coupling for the purpose described having a branch adapted for connection with a tire valve and a tire valve depressor, a branch adapted for connection with the source of air supply, and means for cutting off the supply of air through said branch and establishing a connection between the interior of the tire and the atmosphere, whereby air may be vented from the tire.

3. A coupling for the purpose described having a plurality of branches, one of which is adapted for connection with a tire valve and another of which is adapted for connection with a source of air supply, a tire valve depressor and a plug valve in said last-named branch, said plug valve having a passage adapted to control the flow of air through said last-named branch, and a passage adapted to permit the escape of air from the tire to the atmosphere.

4. A coupling for the purpose described having three branches, one adapted for connection with a tire valve, a tire valve depressor therein, one adapted for connection with a gage and a third adapted for connection with a source of air supply, said branches being connected, and a valve in the last-named branch adapted to open and close communication through the same while permitting communication through the first two-named branches, and having a passage adapted to establish communication between the first-named branch and atmosphere when the valve is in position to close communication through said passage, whereby air may be vented from the tire.

5. A coupling for the purpose described having a plurality of branches, one branch having means for connection with a tire and a tire valve depressor, and another branch being adapted for connection with a source of air supply, a valve in said last-named branch adapted to prevent back-flow of air through said branch, and a second hand-operated valve in said last-named branch adapted to vent air to the atmosphere, whereby air may be vented from the tire.

In witness whereof, we have hereunto signed our names in the presence of two subscribing witnesses.

MAXIMILIAN CHARLES SCHWEINERT.
HENRY P. KRAFT.

Witnesses:
 GRACE GUNDERMAN,
 FRED WHITE.